US010457233B2

(12) United States Patent
Job et al.

(10) Patent No.: US 10,457,233 B2
(45) Date of Patent: Oct. 29, 2019

(54) ADJUSTMENT BRACKETS AND ADJUSTMENT BRACKET ASSEMBLIES

(71) Applicant: Ford Global Technologies LLC, Dearborn, MI (US)

(72) Inventors: David Job, Viewbank (AU); Jason Garbutt, Melbourne (AU)

(73) Assignee: Ford Global Technologies LLC, Dearborn, MI (US)

( * ) Notice: Subject to any disclaimer, the term of this patent is extended or adjusted under 35 U.S.C. 154(b) by 45 days.

(21) Appl. No.: 15/889,581

(22) Filed: Feb. 6, 2018

(65) Prior Publication Data

US 2018/0244224 A1 Aug. 30, 2018

(30) Foreign Application Priority Data

Feb. 27, 2017 (CN) .......................... 2017 1 0108947

(51) Int. Cl.
*B60R 19/24* (2006.01)

(52) U.S. Cl.
CPC ........ *B60R 19/24* (2013.01); *B60R 2019/245* (2013.01)

(58) Field of Classification Search
CPC .................................................... B60R 19/24
USPC ........................................................ 293/155
See application file for complete search history.

(56) References Cited

U.S. PATENT DOCUMENTS

| 3,431,005 | A | * | 3/1969 | Priefert | .................. | B60R 19/52 |
| | | | | | | 280/491.4 |
| 3,671,978 | A | * | 6/1972 | May | ......................... | A61F 2/76 |
| | | | | | | 623/38 |
| 5,277,465 | A | * | 1/1994 | Weir | ...................... | B60R 19/52 |
| | | | | | | 280/762 |
| 6,332,292 | B1 | | 12/2001 | Buzon | | |
| 6,997,585 | B2 | | 2/2006 | Ito | | |
| 8,585,107 | B2 | * | 11/2013 | Kekich, Jr. | ............. | B60R 19/52 |
| | | | | | | 293/115 |
| 2003/0178525 | A1 | * | 9/2003 | Ramer | .................. | A63H 27/06 |
| | | | | | | 244/3.1 |

FOREIGN PATENT DOCUMENTS

| DE | 19937941 A1 | 2/2001 |
| EP | 0155764 A1 | 9/1985 |
| GB | 1238463 A | 7/1971 |
| KR | 100692743 B1 | 3/2007 |

\* cited by examiner

*Primary Examiner* — Joseph D. Pape

(74) *Attorney, Agent, or Firm* — Vichit Chea; Kolitch Romano LLP

(57) ABSTRACT

An adjustment bracket used to adjust a space between a first part and a second part is provided. The adjustment bracket comprises a cylindrical adjustment body including a first disc and a second disc. The first and the second discs are formed by cutting the adjustment body into two equal halves along a slanted surface. The first disc and the second disc are capable of counter rotating at an equal amount at an opposite direction, and the adjustment body has a substantially same thickness around its circumference at a home position, and has a varied thickness when the first and second discs rotates along a central axis away from the home position.

18 Claims, 5 Drawing Sheets

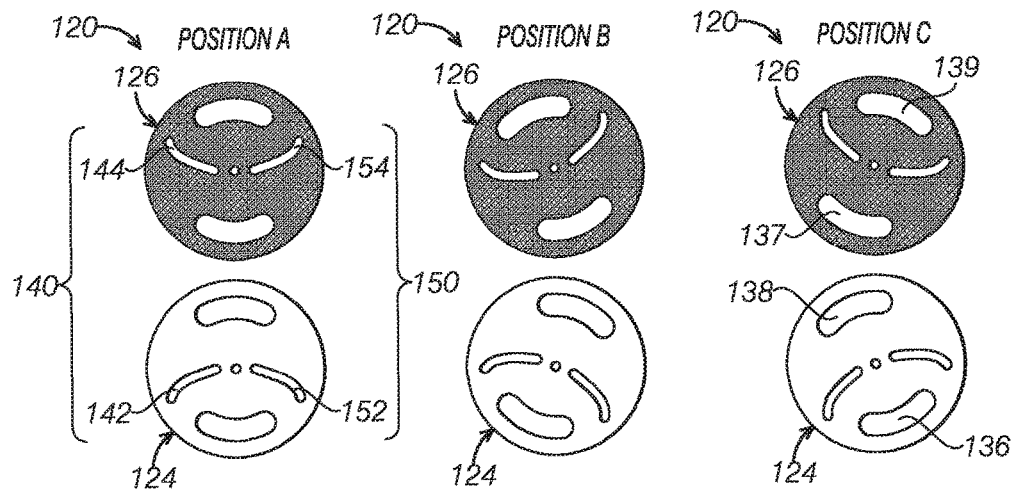
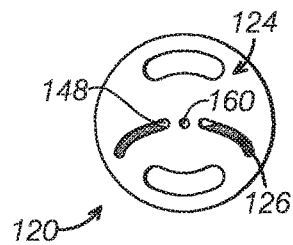 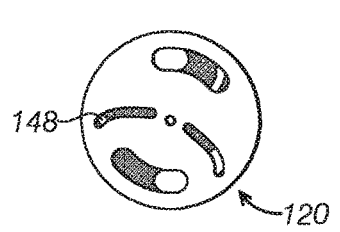 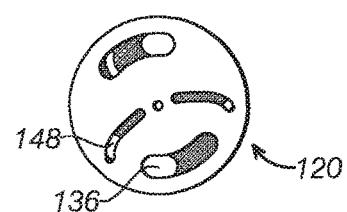
FIG. 3A     FIG. 3B     FIG. 3C
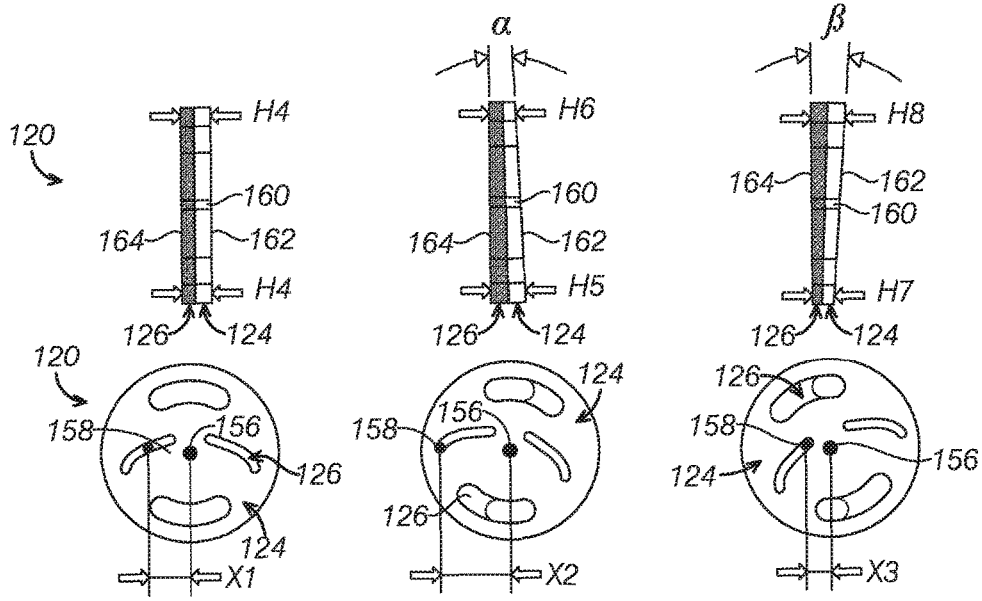
FIG. 4A     FIG. 4B     FIG. 4C

ADJUSTMENT BRACKETS AND ADJUSTMENT BRACKET ASSEMBLIES

RELATED APPLICATION

This application claims the benefit of Chinese Patent Application No.: CN 201710108947.8 filed on Feb. 27, 2017, the entire contents thereof being incorporated herein by reference.

FIELD

The present disclosure relates generally to adjustment brackets and adjustment bracket assemblies, in particular, relates to adjustment brackets and adjustment bracket assemblies used to adjust space between two parts.

BACKGROUND

Planes between two parts may not be parallel during an assemble process due to tolerance during part manufacturing and create problems for connecting the two parts securely. For example, a vehicle bumper that is rail mounted to a fender can produce variable margins between the sides of the bumper and the fender. The rails can have variability about a Y axis (i.e., a horizontal direction) and thus produce a variable margin between the fender and bumper. Any variability about Y axis on the rail mount support location can have a multiplying margin variability effect on the margin between the bumper and fender due to geometry of the component assembly. In some situations, the assembly tolerances cannot be controlled. Thus, there exists a need for an adjustment bracket that can be adjusted and locked into a position to accommodate the margin between two parts.

SUMMARY

According to one aspect, an adjustment bracket is provided to adjust a space between a first part and a second part. The adjustment bracket includes a first disc and a second disc. The first disc has a first surface and a second surface opposite to the first surface and tapered toward the first surface. The second disc has a third surface and a fourth surface opposite to the fourth surface and tapered toward the fourth surface. The second surface of the first disc contacts the third surface of the second disc, the first surface of the first disc and the fourth surface of the second disc are substantially parallel at a home position, and the first surface and the fourth surface forms an angle when the first disc and the second disc rotate at an opposite direction around a central axis away from the home position.

In one embodiment, the first disc has at least one guide slot and the second disc has at least one guide slot, and the guide slots are of spiral shape and are configured to guide the first and the second discs to rotate at the opposite direction with an equal amount.

In another embodiment, the first disc has a first guide slot on a first half of the first disc and a second guide slot on a second half of the first disc, and the second disc has a third guide slot on a first half of the second disc and a fourth guide slot on a second half the second disc. The guide slots are configured to guide the first and the second discs to rotate at the opposite direction at a same angle.

In another embodiment, the guide slots have a spiral shape, the first guide slots are symmetric to the second guide slot and the third guide slot is symmetric to the fourth guide slot relative to a diameter, and the first and the third guide slots constitute a first guide set and the second and fourth guide constitute a second guide set to rotate the first and second discs, and each guide set is used to adjust a relative position of the first and second discs at a time.

In another embodiment, the first disc includes a first tab at a first edge and the second disc include a second tab at a second edge opposite to the first edge. The first tab and the second tab are connected to a linkage, respectively, and a rotation of the first disc and the second disc at an equal amount at the opposite direction is enabled via movement of the linkage.

In another embodiment, each of the first and second discs includes a central hole to receive a central pivot that positions the first and second discs during adjustment of the first and second discs and secures the first and second discs together after the adjustment.

In another embodiment, each of the first and second discs includes at least one elongated fastener slot.

According to another aspect, an adjustment bracket used to adjust a space between a first part and a second part is provided. The adjustment bracket comprises a cylindrical adjustment body including a first disc and a second disc, the first and the second discs are formed by cutting the adjustment body into two equal halves along a slanted surface. The first disc and the second disc are capable of counter rotating at an equal amount at an opposite direction such that the adjustment body has a substantially same thickness around its circumference at a home position, and has a varied thickness when the first and second discs rotates along a central axis away from the home position.

In one embodiment, the first disc has at least one guide slot and the second disc has at least one guide slot, the guide slots are of spiral shape and at least partially overlapped. The guide slots are configured to guide the first and the second discs to rotate at the opposite direction at the equal amount.

In another embodiment, the first disc includes a first tab at a first edge and the second disc include a second tab at a second edge opposite to the first edge, and the first tab and the second tabs are connected to a linkage, respectively. A rotation of the first disc and the second disc at an equal amount at the opposite direction is enabled via movement of the linkage.

In another embodiment, each of the first and second discs includes a central hole to receive a central pivot that positions the first and second discs during adjustment of the first and second discs and secures the first and second discs together after the adjustment.

In another embodiment, each of the first and second discs includes at least one elongated fastener slot.

According to another aspect, an adjustment bracket assembly used to connect a first vehicle part and a second vehicle part is provided. The adjustment bracket assembly comprises a first disc and a second disc. The first disc has a first surface, a second surface opposite to the first surface and tapered toward the first surface, and a central hole. The second disc has a third surface, a fourth surface opposite to the fourth surface and tapered toward the fourth surface and a central hole. The adjustment bracket assembly further comprises a disc position adjustment mechanism configured to enable rotation the first and second discs at an opposite direction with an equal amount via a tool. The second surface of the first disc contacts the third surface of the second disc, the first surface of the first disc and the fourth surface of the second disc are substantially parallel at a home position, and the first surface and the fourth surface forms an angle when the first disc and the second disc rotate away from the home position.

In one embodiment, the disc position adjustment mechanism includes a first spiral slot on the first disc and a second spiral slot on the second disc, and the tool is a sliding pin. A relative position of the first and second discs are adjusted by inserting the sliding pin into the first and second spiral slots and rotating one of the first and second discs.

In another embodiment, the disc position adjustment mechanism includes a first tab at a first edge of the first disc and a second tab at a second edge of the second disc and the tool is a linkage including a first bar and a second bar. The first tab is connected to the first bar and the second tab is connected to the second bar, and the rotation of the first disc and the second disc at the opposite direction with the equal amount is enabled via movement of the linkage.

In another embodiment, the first and second discs are preassembled to have a predetermined angle between the first surface of the first disc and the fourth surface of the second disc via the disc position adjustment mechanism and the tool and wherein the first and second discs are fixed together by a center fastener.

In another embodiment, a relative position of the first and second discs are adjusted via the disc position adjustment mechanism and the tool when assembling with the first and second vehicle parts.

In another embodiment, the adjustment bracket assembly further includes a base plate including a locking groove and the first and second discs are locked at a predetermined position by inserting a central screw into the central hole of the first and second discs.

In another embodiment, each of the first and second discs includes two elongated fastener slots opposite each other to allow fasteners pass through to connect the adjustment bracket to the first and second vehicle parts.

In another embodiment, the first vehicle part is a bumper rail and the second vehicle part is a bumper beam, and wherein the thickness of the adjustment body is varied to fit a gap between the bumper rail and the bumper beam.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

FIGS. 3A-3C shows exploded plan view and overlaid plan view of two discs of an adjustment bracket according to an example embodiment of the present disclosure, illustrating different positions of one disc relative to another disc.

4A-4C shows an adjustment bracket 120 according to an example embodiment of the present disclosure, illustrating the relative positions of a first and second discs.

Figure 5:
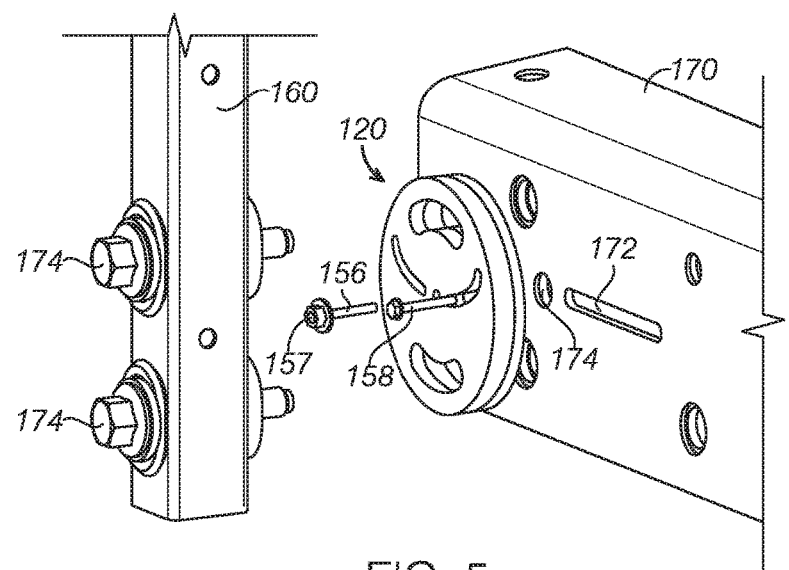

FIG. 5 shows the adjustment bracket in FIGS. 3-4 when used to connect two parts.

Figure 6:
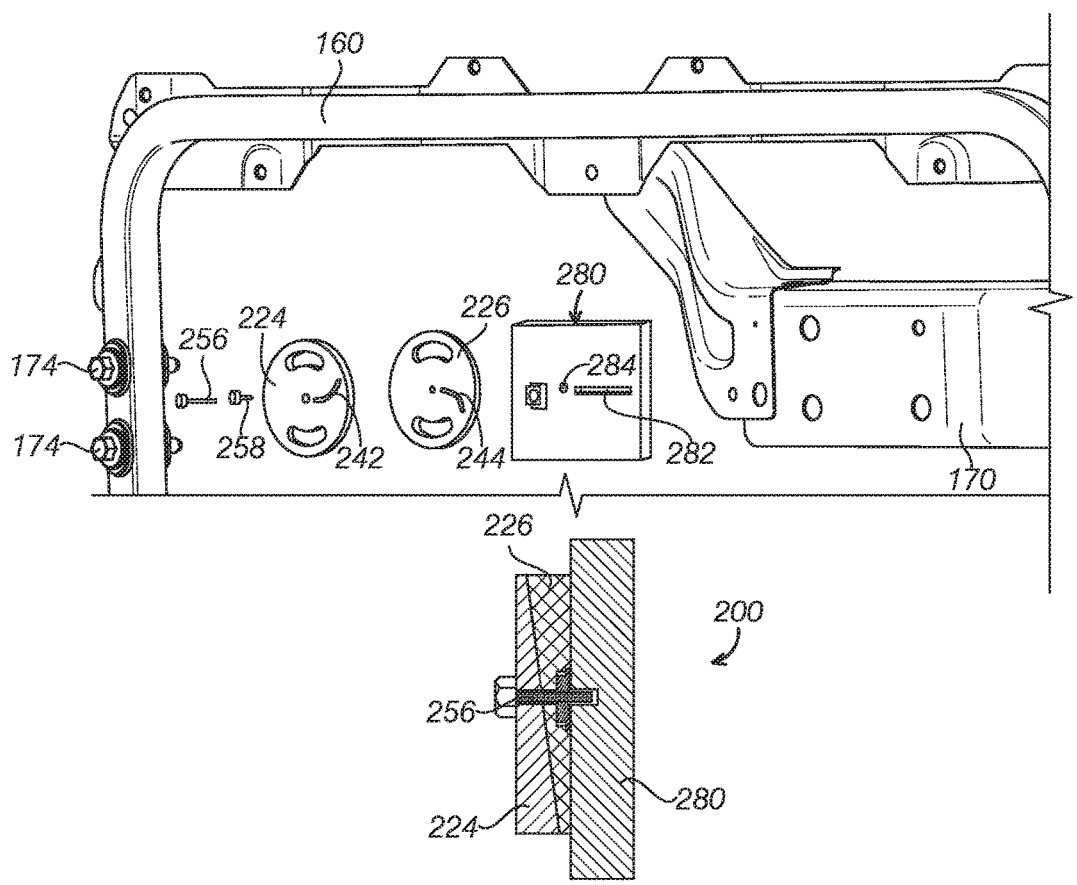
Figure 7:
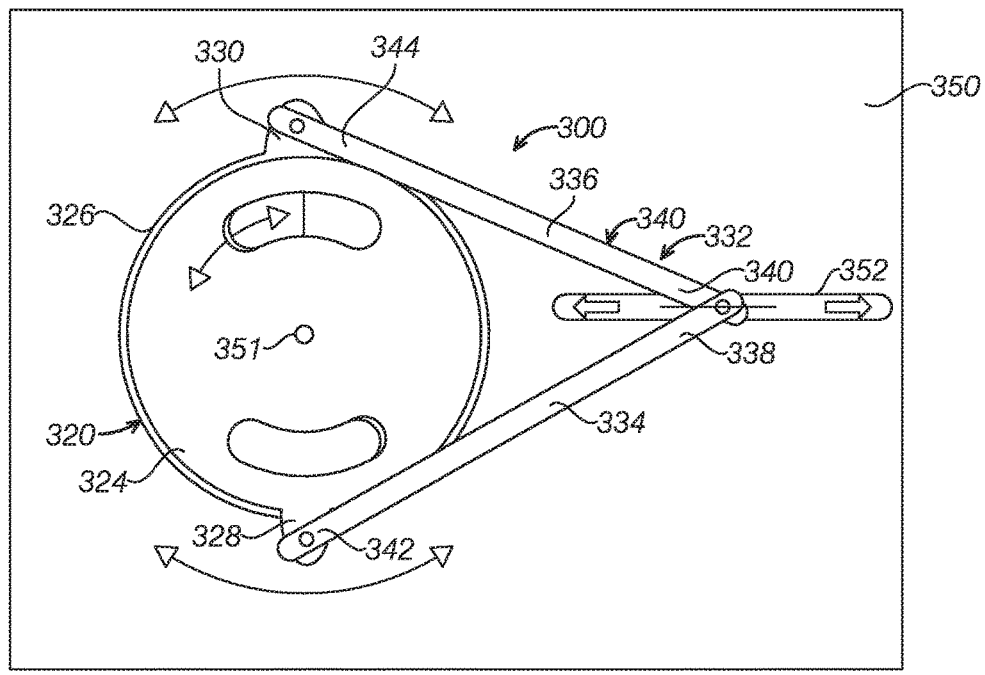

FIG. 6 shows an exploded view of an adjustment bracket assembly 200, a bumper rail 160 and a bumper beam 170 according to another embodiment of the present disclosure FIG. 7 shows an adjustment bracket assembly 300 according to anther embodiment of the present disclosure.

Figure 8:
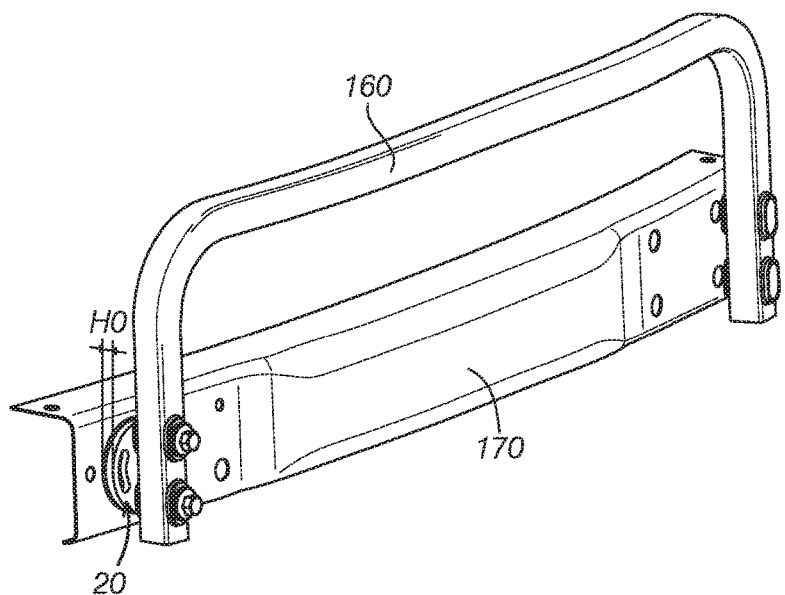
Figure 9:
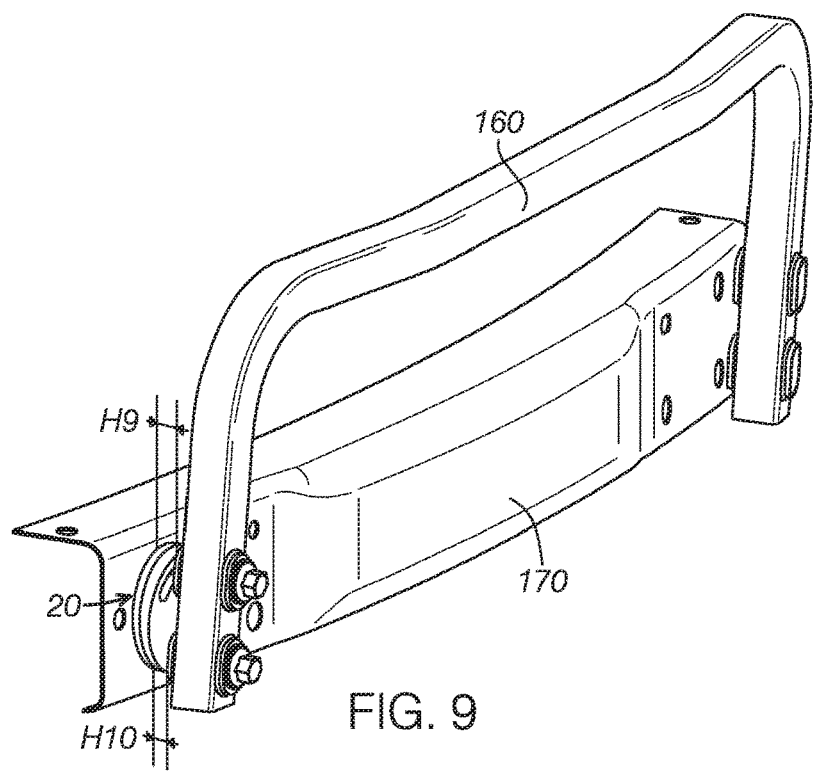
Figure 10:
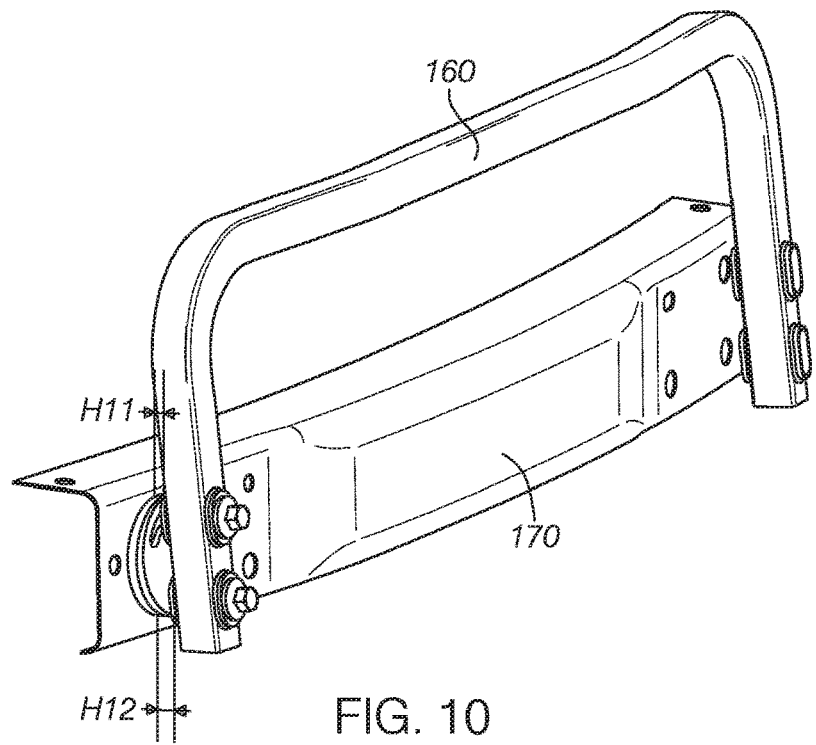

FIGS. 8-10 illustrate an example implementation of an adjustment bracket 20 used in connecting two parts in a vehicle.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed adjustment brackets and adjustment bracket assembly will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of adjustment brackets and adjustment bracket assemblies are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figures 1A, 1B, 1C:
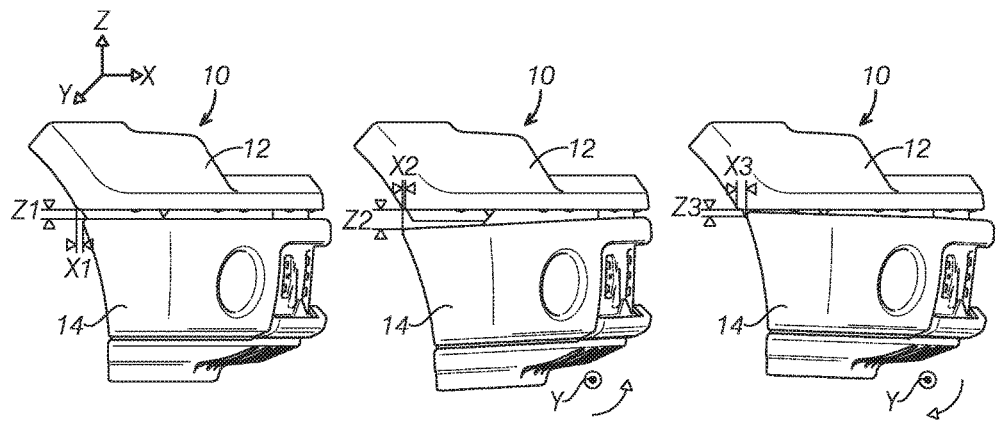
FIGS. 1A-1C are perspective view of a vehicle front portion, illustrating margins between two parts.

FIGS. 1A-1C are perspective view of a vehicle front portion 10, illustrating effect of margins and flushness with rotation about an axis. FIG. 1A shows normal margins X1 and Z1 between a bumper assembly 12 and a fender 14. FIG. 1B shows margins X2 and Z2 when one of the bumper assembly 12 and the fender 14 rotates about a Y axis counter clock wise. As a result of the rotation, the x margin decreases to X2 while the z margin increases to Z2 at a left side of vehicle front portion 10. The left side refers to a side when viewed in front of the vehicle. FIG. 1C shows margins X3 and Z3 when one of the bumper assembly 12 and the fender 14 rotates about a Y axis clockwise. As a result of the rotation, the x margin increases to X3 while the z margin decreases Z3 at a left side of the vehicle front portion 10. As shown in FIGS. 1B-1C, the margin variability is multiplied. An adjustment bracket is needed to secure the bumper assembly 12 and fender 14 robustly.

Figures 2A, 2B, 2C:
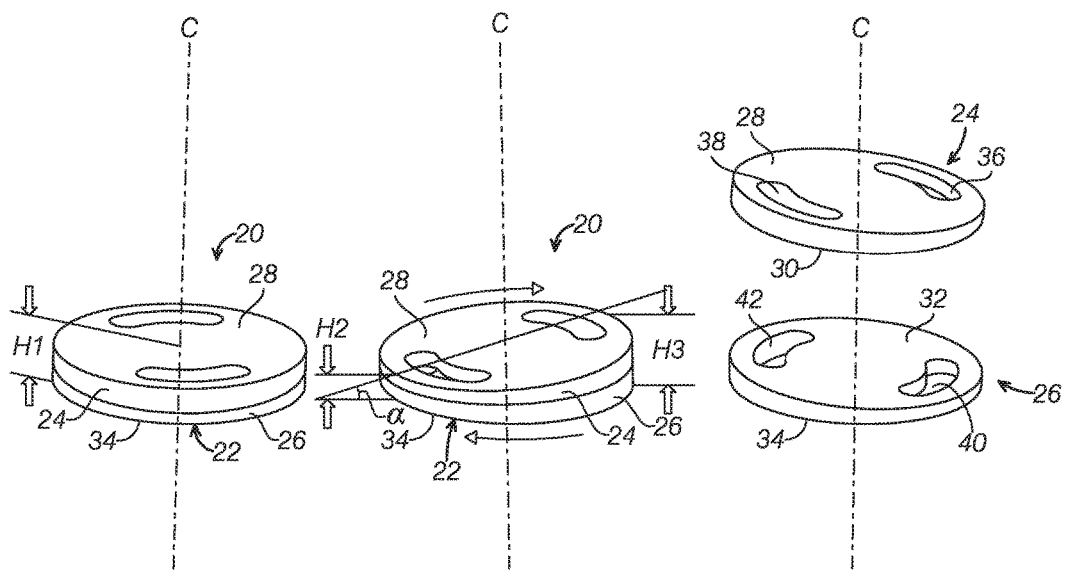
FIGS. 2A-BC are perspective views of an example adjustment bracket according to one embodiment of the present disclosure.
FIG. 2C is an exploded view of the adjustment bracket.

Referring to FIGS. 2A-2C, FIGS. 2A-2B are perspective views of an example adjustment bracket 20 according to one embodiment of the present disclosure. FIG. 2C is an exploded view of adjustment bracket 20. The adjustment bracket 20 may include an adjustment body 22 including a first disc 24 and a second disc 26. The first disc 24 and the second disc 26 may be formed by cutting a cylindrical body into two equal halves along a slanted surface. The first disc 24 includes a first surface 28 and a second surface 30 tapered to the first surface 28. The second disc 26 includes a third surface 32 and a fourth surface 34 and the third surface 32 is tapered to the fourth surface 34. The second surface 30 of the first disc 24 contacts the third surface 32 of the second disc 26. FIG. 2A shows the first surface 28 of the first disc 24 is substantially parallel to the fourth surface 34 of the second disc 26, which is defined as a home position in this application. At the home position, the adjustment bracket 20 has a cylindrical shape and a thickness H1 along a circumference of the first and second discs 24, 26 is substantially the same. When the first disc 24 and the second disc 26 rotate at an opposite direction with an equal amount around a central axis C, a thickness along the circumference varies and the adjustment body 22 has a wedge-like shape or become a uniform wedge. In other words, the first surface 28 of the first disc 24 has an angle α with the fourth surface 34 of the second disc 26 when the first and second discs 24 and 26 rotate away from the home position. FIG. 2B illustrates a smaller thickness H2 at one end and a greater thickness H3 of the adjustment body 22 at another end.

The adjustment bracket 20 may provide the adjustment body 22 with the tapered surfaces with different angles or different wedge sizes by rotating the first and second discs 24 and 26 in the opposite direction with the equal amount. In this way, the adjustment bracket 20 may be used to adjust various margins between the two parts and thus obtain robust connection.

The adjustment bracket 20 may include at least one fastener slot to receive a fastener to fix two parts together. FIG. 2C show that the first discs 24 includes two elongated slots 36 and 38 which are symmetric to a diameter and the second discs 26 includes two corresponding elongated slots 40 and 42 which are symmetric to a diameter.

It will be appreciated that the discs of the adjustment bracket can have any appropriate shape although the discs are shown to have a circular shape in the figures of the present application. For example, the discs may have an oval shape.

An adjustment bracket may include a disc position adjustment mechanism to rotate the two discs at an opposite direction with an equal amount. FIGS. 3A-3C and FIGS. 4A-4C illustrate an adjustment bracket 120 according to an example embodiment of the present disclosure, illustrating the relative positions of a first and second discs. FIG. 3A shows the adjustment bracket at a position A, illustrating an exploded view and overlaid view of the adjustment bracket. The adjustment bracket 120 may include a first disc 124 and a second disc 126 which have tapered surfaces as described above in association with FIG. 2A-2C. The adjustment bracket 120 may further include a disc position adjustment mechanism 140. In some embodiments, the disc position adjustment mechanism may include a first set of guide slots 142 and 144 in the first and second discs, respectively. For example, the first disc 126 may have a first guide slot 142 at its first half and the second disc 126 may have a third guide slot 144 at its first half corresponding to the first half of the first disc 124. At an overlaid position, the first guide slot 142 and third guide slot 144 partially overlap to create an insertion space 148 for a tool to rotate one of the first and second discs 124 and 126 at an opposite direction with an equal amount. FIGS. 3A-3C show the insertion space 148 at different positions A, B and C while the insertion space 148 is available for the tool. The tool such as a pin positioned into the insertion space 148 can move the first disc 124 and the second disc 126 to rotate around a center the both discs at an opposite direction with an equal amount.

In some embodiments, the disc position adjustment mechanism 140 may further include a second set 150 of guide slots 152 and 154. For example, the first disc 126 may have a second guide slot 152 at its second half and the second disc 126 may have a fourth guide slot 154 at its second half corresponding to the second half of the first disc 124. One set of guide slot is used at a time to adjust the relative position of the first and second discs. In some embodiments, the first guide slot 142 is symmetric to the second guide slot 152 and the third guide slot 144 is symmetric to the fourth guide slot 154. In some embodiments, the guide slots are spiral slots. In the depicted embodiment, each of the first and second guide slots 142, 152 of the first disc 124 is curved from the one end adjacent to a center of both discs downward toward the edge of the first disc, and each of the third and fourth guide slots 144, 154 is curved from the one end adjacent to the center upward toward the edge of the second disc 126. In some embodiments, a curve of each guide slot may be a part of Fibonacci spiral. In some embodiments, the shape of the spiral may be configured such that the first guide slot 142 overlaps with the third guide slot 144 and the second guide slot 152 overlaps with the fourth guide slot 154 when the first and the second discs at a position which is 180 degrees from the home position.

Continuing with FIGS. 3A-3C, the first disc 124 may include a first and a second fastener slots 136 and 138 and the second disc 126 may include corresponding third and fourth fastener slots 137 and 139. The first and third fastener slots 136 and 137 overlap entirely at the home position (i.e., Position A in FIG. 3A) and overlap partially at the positions away from the home position (i.e., positions B and C as shown in Figs. B and C). The second and fourth fastener slots 138 and 139 overlap entirely at the home position (i.e., Position A) and overlap partially at the positions away from the home position (i.e., Positions B and C). In some embodiments, the fastener slots may be of an elongated shape along the circumference such that a space is available to receive a fastener bolt when the discs rotate away from the home position.

FIGS. 4A-4C shows the first and second discs 124 and 126 at an overlaid position and a sectional view from section D-D, illustrating the mechanisms to produce the adjustment bracket 120 with different thickness. The tools such as a center pivot 156 and a sliding pin 158 may be used to accomplish the adjustment on the dimension or the thickness of the adjustment bracket 120. The center pivot 156 may pass a central hole 160 of the first and second discs 124 and 126 to temporarily secure the first and second discs 124 and 126 together and provide a pivot point or a rotation shaft for the rotation of the first and second discs. The sliding pin 158 may be used to rotate the first and second discs 124 and 126. As shown in FIG. 4A-4C, the sliding pin 158 is located in the first spiral slot 142 of the first disc 124 and the third spiral slot 144 of the second disc 126. Lateral movement of the sliding pin 158 makes the first disc 124 and the second disc 126 rotate at opposite direction, and thus creating the various thickness. In some embodiments, the first and second discs may be locked at a predetermined position by a location locking bolt received in the first and the third guide slots or the second and fourth guide slots.

FIG. 4A shows a home position at which an outer surface 162 of the first disc 124 is substantially parallel an outer surface 164 of the second disc 126, or there is zero-degree rotation from the home position. At the home position, the thickness of the adjustment bracket 120 is about the same around its circumference, that is, H4. FIG. 4A also shows that the sliding pin 158 is located at a position adjacent to a middle point of the spiral slots and the distance of the slide pin 158 to the center 160 of the discs is X1.

FIG. 4B shows that the sliding pin 158 is moved left to a position with a distance X2 to the center and X2 is greater than X1. At this position, the first and second discs 124 and 126 have rotated in opposite directions with a first degree. The first outer surface 162 is tapered to the second outer surface 164 with an angle α and the adjustment bracket 120 has varied thickness around its circumference. FIG. 4B shows the thickness H5 is greater than the thickness H6 or H5 may be defined as H4+2Y and H6 may be defined as H4−2Y. In other words, the adjustment bracket 120 has a wedge shape after rotation away from the home position. The dimension of the wedge can be changed by rotating the two discs with different degrees.

FIG. 4C shows that the sliding pin 158 is moved right to a position with a distance X3 to the center 160 and X3 is less than X1. At this position, the first and second discs 124, 126 are rotated in opposite directions with a same degree as the first degree but different clockwise direction. The first outer surface 162 is tapered to the second outer surface 164 with an angle β sloped in a direction different from α and the adjustment bracket 120 has varied thickness around its circumference. FIG. 4C shows the thickness H8 is greater than the thickness H7 and H8 may be defined as H4+2Y and H7 may be defined as H4−2Y.

In some embodiments, the disc rotation may be limited to approximately 45 degrees to the left and 45 degrees to the right, depending on the size of the fastener slots 136, 137, 138, 139 of the first and second discs. Each of the first and second discs has a taper surface relative to each other. If the thickness of the individual disc changes a lot from one side to another side (i.e., the individual disc has a greater slope), only a slight rotation between the discs will cause a big change in the angle between the two outer surfaces. On the other hand, a small variation in thickness from one side to another side of the individual disc, the small rotation between the discs will cause smaller angle change between the two outer surfaces for the same rotation between the discs.

The adjustment bracket consisting of two tapered discs may generate a wedge shape with various dimension by rotating the two discs in opposite direction with an equal amount. In this way, the adjustment bracket may be used to connect the parts with various margins.

FIG. 5 shows the adjustment bracket 120 used to connect two parts. With further reference to FIGS. 3-4, an application of the adjustment bracket 120 in connecting two parts are illustrated. In the depicted embodiments, the two parts are a bumper rail 160 and a bumper beam 170 of a vehicle. In some embodiments, the adjustment bracket 120 may be adjusted to a desired shape during an assembling process. For example, the bumper beam 170 may include an aperture 172 and a locking hole 174. A center pivot 156 may be provided and passes a central hole 160 of the first and second discs 124 and 126 and a location hole 174 to secure the adjustment bracket 120. A sliding pin 158 may be provided and inserted into the guide slots of the first and second discs 124 and 126 and the aperture 172 to rotate the first and second discs 124 and 126 to make the adjustment bracket 120 to fit into the margin between the bumper rail 160 and the bumper beam 170. Once the desired position is found, the first and second discs 124 and 126 may be secured by tightening a central pivot nut 157 on the central pivot 156 to further secure the first and second discs 124 and 126 at the desired position. The sliding pin 158 may be removed from the adjustment bracket 120. The bumper rail 160 and the bumper beam 170 can be connected via fasteners 174. It should be appreciated that the adjustment bracket can be used to connect any parts that need margin adjustment.

FIG. 6 shows an exploded view of an adjustment bracket assembly 200, a bumper rail 160 and a bumper beam 170 according to another embodiment of the present disclosure. The adjustment bracket assembly 200 may include an adjustment bracket 220 including a first disc 224 and a second disc 226, a base plate 280, a locking screw 256. The base plate 280 may include an elongated groove 282 and a recess 284. The tools such as a sliding pin 258 and a central pivot may be used to fine-tune the shape of the adjustment bracket 200 In some embodiments, the locking screw 256 may be used as the central pivot. The first and second discs 224 and 226 may be held by the central pivot 256 on the base plate 280 and the central pivot 256 extends into the recess 284 to provide a reference to rotate the discs. The sliding pin 258 may insert into the guide slots 242 and 244 of the first and second discs 224, 126 and the groove 282. The various wedge shapes of the adjustment bracket 220 are formed by moving the sliding pin 258 in the groove 282. Once a desired shape is determined, the first and second discs 224, 226 are secured by the central pivot 256 on the base plate 280. The adjustment bracket 220 and the base plate 280 may be positioned between the bumper rail 160 and the bumper beam 170 to fit the gap or margin so that the bumper rail 160 and the bumper bam 170 can be connected without undesired clearance between the vehicle parts.

The adjustment bracket may be tuned in-situ to adjust margins of two parts to be connected. Alternatively, in some applications, the margins or clearance between two parts are known for a line of production, such as for a specific assembly line of vehicles. The adjustment bracket may be preassembled to have a predetermined tapered surface or have a desired wedge shape so that the preassembled adjustment bracket can be used for that specific line of production.

FIG. 7 shows an adjustment bracket assembly 300 according to another embodiment of the present disclosure. For the sake of brevity, in this example, the elements and features similar to those previously shown and described will not be described in much further detail. The adjustment bracket assembly 300 may include an adjustment bracket 320 and a disc position adjustment mechanism 340. The adjustment bracket 320 may include a first disc 324 and a second disc 326, each with a tapered surface. The first disc 324 may include a first tab 328 on an edge portion and the second disc 326 may include second tab 330 on an edge portion. The disc position adjustment mechanism 340 may include a linkage 332 having a first bar 334 and a second bar 336 pivotally connected to the first bar 334. A first end 338 of the first bar 334 is pivotally connected to a first end 340 of the second bar 336 and a second end 342 of the first bar 334 is pivotally connected to the first tab 328 of the first disc 324 while the second end 344 of the second bar 336 is pivotally connected to the second tab 330 of the second disc 326. By moving the linkage 332 in a linear motion as shown in the arrows in FIG. 7, the first and second discs 324 and 326 will rotate in equal amount in opposite directions. In some embodiments, the first disc 324 and the second disc 326 may include a central hole 351 for a center pivot for securing the first and second discs 324, 326. In some embodiments, the adjustment bracket assembly may further include a support structure 350. The support structure 350 may include a slot 352 for the pivot connection of the first bar 334 and the second bar 336.

The first bars 334, 336 may be detachably connected to the first and second tabs 328 and 330, respectively by snap fitting, such as fitting a recess with a protrusion, for example. Once a desired shape of the adjustment bracket 320 is achieved and the two parts are connected, the linkage 332 may be removed from the first and second discs 324 and 326. In addition to set up a desired shape of the adjustment bracket 320 during assembling process, the adjustment bracket 320 may be preassembled via the linkage 332 and secured together by a locking fastener (not shown).

FIGS. 8-10 illustrate an example implementation of an adjustment bracket 20 used in connecting two parts in a vehicle. The adjustment bracket 20 may be used to connect a bumper rail 160 and a bumper beam 170. FIG. 8 shows no tilted position between the bumper rail 160 and the bumper beam 170. The adjustment bracket 20 may be fitted into the space at its home position (i.e., a position where two outer surfaces of the adjustment bracket 20 are substantially parallel and the height H0 is the same along the circumference of the adjustment bracket 20).

FIG. 9 shows that the bumper rail 160 is forward tilted relative to the bumper beam 170. The adjustment bracket 20 may be adjusted to have a shape with a greater thickness H9 at an upper position and a less thickness H10 at a lower position. In this way, the adjustment bracket 20 fills the space resulted from the tilting so that the bumper rail 160 can be tightly fit with the bumper beam 170.

FIG. 10 shows that the bumper rail 160 is rearward tilted relative to the bumper beam 170. The adjustment bracket 20 may be adjusted to have a shape with a less thickness H11 at an upper position and a greater thickness H12 at a lower position. In this way, the adjustment bracket 20 fills the space resulted from the tilting so that the bumper rail 160 can be tightly fit with the bumper beam 170.

The adjustment bracket assembly of the present disclosure can orientate a bumper beam on the attachment bumper rail to compensate for any component or assembly variations. As described above, several approaches may be employed to use the adjustment bracket. In one example, the adjustment bracket is pre-adjusted at a predetermined shape based on the nominal offset angles for vehicle rail brackets. That is, the adjustment bracket is preassembled and then fitted into the two parts such as a bumper rail and a bumper beam. In another example, the adjustment bracket is fitted to the vehicle beam and adjusted in position with an inclinometer to achieve the required plane of rotation for mounting the bumper rail. In yet another example, the adjustment bracket is fitted to the vehicle bumper beam and then the bumper rail is attached. An access is provided for adjusting the adjustment bracket prior to tightening up the fasteners to hold the bumper beam in the correction orientation or position. The adjustment bracket or the adjustment bracket assembly are advantageous because it can rotate about one or more planes to provide various shapes to adjust the margin. Further, it is simple in use and has low manufacture cost.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions, and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. An adjustment bracket assembly used to adjust a space between a first part and a second part, comprising:
   a first disc having a first surface and a second surface, wherein the second surface is opposite to the first surface and tapered toward the first surface;
   a second disc having a third surface and a fourth surface, wherein the third surface is opposite to the fourth surface and tapered toward the fourth surface; and
   a disc position adjustment mechanism configured to enable rotation of the first and second discs at an opposite direction with an equal amount via a tool; and
   wherein the second surface of the first disc contacts the third surface of the second disc, the first surface of the first disc and the fourth surface of the second disc are substantially parallel at a home position, and the first surface and the fourth surface forms an angle when the first disc and the second disc rotate at an opposite direction around a central axis away from the home position.

2. The adjustment bracket assembly of claim 1, wherein the disc position adjustment mechanism includes at least one guide slot on the first disc and at least one guide slot on the second disc, wherein the tool is a sliding pin, and wherein the guide slots are of spiral shape and are configured to guide the first and the second discs to rotate at the opposite direction with an equal amount via a movement of the sliding pin in the guide slots.

3. The adjustment bracket assembly of claim 1, wherein the disc position adjustment mechanism includes a first guide slot on a first half of the first disc, a second guide slot on a second half of the first disc, a third guide slot on a first half of the second disc and a fourth guide slot on a second half the second disc, wherein the tool is a sliding pin and wherein the guide slots are configured to guide the first and the second discs to rotate at the opposite direction at a same angle via a movement of the sliding pin in the first guide slot and the third guide slot or a movement of the sliding pin in the second guide slot and the fourth guide slot.

4. The adjustment bracket assembly of claim 3, wherein the guide slots have a spiral shape, the first guide slot is symmetric to the second guide slot and the third guide slot is symmetric to the fourth guide slot relative to a diameter, and wherein the first and the third guide slots constitute a first guide set and the second and fourth guide slots constitute a second guide set to rotate the first and second discs, and each guide set is used to adjust a relative position of the first and second discs at a time.

5. The adjustment bracket assembly of claims 1, wherein the disc position adjustment mechanism includes a first tab at a first edge of the first disc and a second tab at a second edge of the second disc opposite to the first edge, wherein the tool is a linkage including a first bar and a second bar and wherein the first tab and the second tabs are connected to the first bar and the second bar, respectively, and a rotation of the first disc and the second disc at an equal amount at the opposite direction is enabled via a movement of the linkage.

6. The adjustment bracket assembly of claim 1, wherein each of the first and second discs includes a central hole to receive a central pivot that positions the first and second discs during adjustment of the first and second discs and secures the first and second discs together after the adjustment.

7. The adjustment bracket assembly of claim 1, wherein each of the first and second discs includes at least one elongated fastener slot.

8. An adjustment bracket used to adjust a space between a first part and a second part, comprising:
 a cylindrical adjustment body including a first disc and a second disc, wherein the first and the second discs are formed by cutting the adjustment body into two equal halves along a slanted surface,
 wherein the first disc and the second disc are capable of counter rotating at an equal amount at an opposite direction, wherein the adjustment body has a substantially same thickness around its circumference at a home position, and has a varied thickness when the first and second discs rotates along a central axis away from the home position; and
 wherein the first disc includes a first tab at a first edge and the second disc include a second tab at a second edge opposite to the first edge, and wherein the first tab and the second tabs are connected to a linkage, respectively, and a rotation of the first disc and the second disc at an equal amount at the opposite direction is enabled via movement of the linkage.

9. The adjustment bracket of claim 8, wherein each of the first and second discs includes a central hole to receive a central pivot that positions the first and second discs during adjustment of the first and second discs and secures the first and second discs together after the adjustment.

10. The adjustment bracket of claim 8, wherein each of the first and second discs includes at least one elongated fastener slot.

11. An adjustment bracket assembly used to connect a first vehicle part and a second vehicle part, comprising:
 a first disc having a first surface, a second surface, and a central hole, wherein the second surface is opposite to the first surface and tapered toward the first surface;
 a second disc having a third surface, a fourth surface and a central hole, wherein the third surface is opposite to the fourth surface and tapered toward the fourth surface;
 a disc position adjustment mechanism configured to enable rotation the first and second discs at an opposite direction with an equal amount via a tool,
 wherein the second surface of the first disc contacts the third surface of the second disc, the first surface of the first disc and the fourth surface of the second disc are substantially parallel at a home position, and the first surface and the fourth surface forms an angle when the first disc and the second disc rotate away from the home position.

12. The adjustment bracket assembly of claim 11, wherein the disc position adjustment mechanism includes a first spiral slot on the first disc and a second spiral slot on the second disc, and the tool is a sliding pin, and wherein a relative position of the first and second discs are adjusted by inserting the sliding pin into the first and second spiral slots and rotating one of the first and second discs.

13. The adjustment bracket assembly of claim 11, wherein the disc position adjustment mechanism includes a first tab at a first edge of the first disc and a second tab at a second edge of the second disc and the tool is a linkage including a first bar and a second bar, and wherein the first tab is connected to the first bar and the second tab is connected to the second bar, and the rotation of the first disc and the second disc at the opposite direction with the equal amount is enabled via a movement of the linkage.

14. The adjustment bracket assembly of claim 11, wherein the first and second discs are preassembled to have a predetermined angle between the first surface of the first disc and the fourth surface of the second disc via the disc position adjustment mechanism and the tool and wherein the first and second discs are fixed together by a center fastener.

15. The adjustment bracket assembly of claim 11, wherein a relative position of the first and second discs are adjusted via the disc position adjustment mechanism and the tool when assembling with the first and second vehicle parts.

16. The adjustment bracket assembly of claim 11, further include a base plate including a locking groove and the first and second discs are locked at a predetermined position by inserting a location locking bolt into the central hole of the first and second discs.

17. The adjustment bracket assembly of claim 11, wherein each of the first and second discs includes two elongated fastener slots opposite each other to allow fasteners pass through to connect the adjustment bracket to the first and second vehicle parts.

18. The adjustment bracket assembly of claim 11, wherein the first vehicle part is a bumper rail and the second vehicle part is a bumper beam, and wherein the first disc and the second disc forms an adjustment body and a thickness of the adjustment body is varied to fit a gap between the bumper rail and the bumper beam.

* * * * *